United States Patent [19]
Tomko

[11] Patent Number: 6,166,127
[45] Date of Patent: Dec. 26, 2000

[54] INTERPENETRATING NETWORKS OF POLYMERS

[75] Inventor: Revathi R. Tomko, North Olmsted, Ohio

[73] Assignee: The Sherwin-Williams Company, Cleveland, Ohio

[21] Appl. No.: 09/102,803

[22] Filed: Jun. 23, 1998

Related U.S. Application Data

[60] Provisional application No. 60/051,136, Jun. 27, 1997.

[51] Int. Cl.$^7$ .................................................. C08L 83/00
[52] U.S. Cl. ........................................................ 524/507
[58] Field of Search ............................................... 524/507

[56] References Cited

U.S. PATENT DOCUMENTS

| | | | |
|---|---|---|---|
| 3,705,164 | 12/1972 | Honig et al. | 260/29.6 |
| 4,318,833 | 3/1982 | Guagliardo | 524/457 |
| 4,497,932 | 2/1985 | Trovati | 524/591 |
| 4,644,030 | 2/1987 | Loewrigkeit et al. | 524/457 |
| 4,722,965 | 2/1988 | Wong et al. | 524/812 |
| 4,730,021 | 3/1988 | Zom et al. | 524/457 |
| 5,023,294 | 6/1991 | Cozzi et al. | 524/547 |
| 5,173,526 | 12/1992 | Vijayendran et al. | 524/457 |
| 5,202,378 | 4/1993 | Barnett | 524/833 |
| 5,314,942 | 5/1994 | Coogan et al. | 524/457 |
| 5,364,741 | 11/1994 | Huynh-Tran et al. | 430/300 |
| 5,371,133 | 12/1994 | Stanley | 524/457 |
| 5,541,251 | 7/1996 | Bontinck et al. | 524/507 |
| 5,763,529 | 6/1998 | Lucas | 524/507 |
| 5,900,457 | 5/1999 | Duan et al. | 524/591 |

FOREIGN PATENT DOCUMENTS

| | | | |
|---|---|---|---|
| 0 239 213 A2 | 9/1987 | European Pat. Off. | C09J 3/14 |
| 0 308 115 A2 | 3/1989 | European Pat. Off. | C08F 283/00 |
| 0 309 113 A1 | 3/1989 | European Pat. Off. | C08L 75/04 |
| 0 309 114 A1 | 3/1989 | European Pat. Off. | C08F 283/00 |
| 0 353 797 A1 | 2/1990 | European Pat. Off. | C08G 18/08 |
| 0 658 608 A1 | 6/1995 | European Pat. Off. | C09D 157/00 |
| WO 95/26994 | 10/1995 | WIPO | C08G 18/08 |

OTHER PUBLICATIONS

A. Patsis, H. X. Xiao, K. C. Frisch, and S. Al–Khatib; "Ionomer/Semi–IPN Coatings from Polyurethanes and Vinyl Chloride Copolymers" —Journal of Coatings Technology; Dec. 1986; vol. 58, pp. 41–47.

M. Tehranisa, R. A. Ryntz, H. X. Xiao, P. I. Kordomenos, and K. C. Frisch; "Urethane Acrylic Interpenetrating Polymer Networks (IPNs) For Coating Applications" —Journal of Coatings Technology; Mar. 1987; vol. 59—pp. 43–49.

*Primary Examiner*—Janet Baxter
*Assistant Examiner*—Yvette M. Clarke
*Attorney, Agent, or Firm*—Vivien Y. Tsang; Robert E. McDonald; Paul R. Katterle

[57] ABSTRACT

A process for producing a coating compositions having superior solvent resistance and film hardness comprising an interpenetrating network of a polyurethane component and a functionalized waterborne polymer, wherein the polyurethane component is prepared in the presence of the functionalized waterborne polymer and said polyurethane component and said waterborne polymer are crosslinked directly or indirectly via the chain extender.

7 Claims, No Drawings

INTERPENETRATING NETWORKS OF POLYMERS

This application claims the benefit of U.S. Provisional Application No. 60/051,136 filing date Jun. 27, 1997.

BACKGROUND OF THE INVENTION

This invention relates to a method of making an interpenetrating network of waterborne polymers and the coating compositions produced from such interpenetrating networks. The invention involves coreacting a waterborne polyurethane component and a functionalized waterborne polymer component wherein the functional groups of the waterborne polymer react directly with the functional groups of the polyurethane component or react indirectly with the polyurethane component via the functional groups of the chain extender. Alternatively, the polyurethane component reacts with a chain extender and the functionalized waterborne polymer component independently reacts with a chain extender that may be the same or different than the chain extender which reacts with the polyurethane prepolymer to create an interpenetrating polymer network. Coatings produced from the interpenetrating networks of the present invention possess superior solvent resistance and film hardness and are particularly useful as high performance industrial coatings.

Other methods of producing interpenetrating polymer networks involve dispersing polymerizable monomers in a polyurethane dispersion and then polymerizing the monomers in the presence of the polyurethane. U.S. Pat. No. 4,198,330 discloses a method for making a stable aqueous dispersion of polymeric material which comprises: (a) producing an isocyanate-terminated polyurethane prepolymer in the presence of an inert liquid polymerizable ethylenically unsaturated monomer material as a solvent or diluent; (b) dispersing the resulting product in water; (c) chain-extending the prepolymer in the resulting aqueous dispersion; and (d) subjecting the resulting aqueous dispersion to vinyl addition polymerization conditions to polymerize the monomer material in-situ. The polymerizable ethylenically unsaturated monomers must be inert to the prepolymer-forming reaction; that is, they must be devoid of groups interfering with or reactive with the primary isocyanate and active hydrogen-containing reactants. Thus, the monomers should be devoid of —NCO groups and active hydrogen-containing groups such as —OH.

U.S. Pat. No. 4,730,021 discloses a process for preparing aqueous dispersion of urethane-acrylate graft copolymers comprising (a) reacting a polymerizable acrylate with a diisocyanate to produce a monoacrylated diisocyanate adduct; (b) reacting the adduct of (a) and other polyisocyanates with an organic compound containing at least one active hydrogen atom and a group which is capable of forming a salt group to form a prepolymer; (c) neutralizing the prepolymer and dispersing it in water, immediately followed by chain extending the prepolymer to obtain a chain extended acrylated urethane polymer dispersion.

U.S. Pat. No. 5,173,526 discloses a method for making an aqueous polyurethane-vinyl polymer dispersion which comprises: (a) forming a carboxy-containing, water dispersible, isocyanate terminated polyurethane prepolymer; (b) adding a vinyl monomer composition which includes a polyethylenically unsaturated monomer to the prepolymer/monomer mixture; (c) adding a tertiary amine to the prepolymer/monomer mixture; (d) dispersing the prepolymer/monomer mixture in water; (e) adding an oil soluble free radical initiator and a chain-extender to the aqueous dispersion; and (f) polymerizing the vinyl monomer and completing chain extension of the prepolymer by heating the aqueous dispersion. Suitable vinyl monomers include ethylenically-unsaturated hydrocarbons, esters and ethers, especially esters of acrylic and methacrylic acids, esters of vinyl alcohol and styrene.

SUMMARY OF THE INVENTION

The present invention comprises a polymer network, also referred to herein as an "interpenetrating network" or "IPN" comprising at least two components; a polyurethane component and a functionalized waterborne polymer component, wherein the polyurethane component is at least partially prepared in the presence of the functionalized waterborne polymer component, and wherein the waterborne component contains functional groups that allow the polyurethane component and waterborne polymer component to coreact in situ either directly or indirectly, or to react with chain extender in situ. Additionally, the polyurethane and/or the waterborne polymer components can contain functional groups that allow it to cure or crosslink with itself or with the other component, upon application to the substrate.

While there are a number of different variations and preferred embodiments to the present invention, central to the success of the invention is the preparation of two components, a waterborne polymer component and a polyurethane component. In one embodiment, the polyurethane is prepared as a prepolymer which is neutralized and dispersed into a latex polymer composition and is subsequently chain extended in the presence of functionalized waterborne polymer component. The incorporation of functional groups on both of the polyurethane component or the waterborne polymer component enable the components to crosslink in situ during the preparation of the interpentrating network. The waterborne polymer component may contain functional groups such as amino, hydroxy or mercaptan to react directly with the isocyanate functionality of the polyurethane prepolymer or to react with a polyisocyanate chain extender. Alternatively, the waterborne component may contain functional groups such as isocyanate, epoxy, acetoacetoxy, carbonate or anhydride to react to an amine functional chain extender.

The polymer network produced by the process of the present invention contain interpenetrating networks of two or more polymers and some graft copolymers. The polymer network, and coatings containing the polymer network, produced by the present invention have particular utility as a high performance industrial coating and can be applied to substrates which include various kinds of metal, wood, concrete, cement, brick, plastic, leather and vinyl.

DETAILED DESCRIPTION OF THE INVENTION

The compositions of this invention are polymer systems comprising a polyurethane component and at least one functionalized waterborne polymer component, wherein the polyurethane component and functionalized waterborne component are coreacted to produce a final polymer network that is highly integrated and which has performance characteristics better than a mere physical blend of the individual components. Coating compositions containing the interpenetrating networks of the present invention exhibit superior film properties such as improved MEK resistance, film hardness, water and alkali resistance and flexibility.

In a preferred embodiment, an isocyanate terminated polyurethane prepolymer is first prepared and dispersed in water. The polyurethane prepolymer dispersion is then mixed with the waterborne polymer component and chain extended in the presence of the waterborne polymer component. The waterborne polymer component contains functional groups which are reactive with the NCO groups of the polyurethane prepolymer or the functional groups of the chain extender. The functionalized waterborne polymer component may contain latex polymers, water-reducible alkyds, alkyd emulsions, acrylic polymers, alkyd-acrylic hybrid polymer dispersions, polyester emulsions, fluoropolymer emulsions, polyurethane-acrylic dispersions, silicone emulsions, epoxy dispersions, epoxy-acrylic dispersions, water dispersible or emulsifiable polyisocyanates, polyethylene emulsions, polyurethane dispersions, polyamide dispersions and mixtures thereof. The functional groups of the waterborne polymer may include amine, hydroxy, mercaptan, isocyanate, epoxy, anhydride and/or acetoacetate groups. The polyurethane prepolymer may contain isocyanate, hydroxy, acetoacetoxy, carboxy, mercapto or n-methylol functional groups.

In addition to the coreaction of the polyurethane component and the waterborne polymer component and/or the coreaction of either or both the polyurethane component and the waterborne component with the chain extender, depending on the functionalities present on each component, the components can further crosslink (either individually or together) after application of the coating composition to the substrate.

The composition of the present invention may contain two or more functionalized waterborne components, such as, for example, a latex and a silicone emulsion. Other waterborne polymer components may include, for example, a combination of a latex and a water-reducible alkyd, or an epoxy dispersion and a silicone emulsion.

The process of the present invention is an effective way to intimately combine different waterborne polymers to obtain coating films having the property advantages of the different polymers. It is also an effective way to increase the compatibility of the different waterborne polymers. The process of the present invention produces coating compositions having a high solids content.

Polyurethane Component

As described above, the polyurethane component is generally prepared as a prepolymer that is dispersed in the waterborne polymer component whereafter it is further reacted to produce the final product of this invention. The polyurethane prepolymer is preferably prepared from ingredients that produce a predominantly linear prepolymer, that is, a prepolymer prepared from substantially difunctional reactants. However, branched prepolymers can be prepared in instances where a higher degree of crosslinking is desired.

The polyurethane prepolymer compositions of this invention are generally produced by first reacting an active-hydrogen containing composition with an isocyanate-functional material. The isocyanate-functional material is preferably a diisocyanate-functional material selected from the group of aromatic, cycloaliphatic or aliphatic isocyanates. Examples of suitable isocyanates include 1,6-hexamethylene diisocyanate, 2,4-toluene diisocyanate, 2,6-toluene diisocyanate, 1,4-phenylene diisocyanate, 4,4'-diphenylmethane diisocyanate, 2,4'-diphenylmethane diisocyanate, isophorone diisocyanate, cyclohexane-1,4-diisocyanate, 4,4'-dicyclohexylmethane diisocyanate, p-xylylene diisocyanate, meta-1,1,3,3-tetramethylxylylene diisocyanate and mixtures thereof. Small amounts of trifunctional isocyanates such as a trimer of hexamethylene diisocyanate in the form of isocyanurate or biuret and the trimer of isophorone diisocyanate may be used.

The isocyanate-functional materials are most preferably diisocyanates selected from the group consisting of 4,4'-dicyclohexylmethane diisocyanate, meta-1,1,3,3-tetramethylxylylene diisocyanate, isophorone diisocyanates and mixtures thereof. Most preferred is a combination of 4,4'-dicyclohexylmethane diisocyanate and meta-1,1,3,3-tetramethylxylylene diisocyanate. As with the active-hydrogen containing materials, a minor percentage of the isocyanate-functional materials can have a functionality greater than two, however, an appreciable percentage of such isocyanate ingredients is not acceptable due to the crosslinking effect and branching of both the intermediate and the final product. When a mixture of two or more isocyanates is used, the ratio of NCO equivalents contributed by the individual isocyanates is not critical.

The active-hydrogen containing composition that is reactive with the isocyanate is preferably difunctional with respect to isocyanate groups, that is, they have two active hydrogen atoms as determined by the Zerewitinoff method. Active hydrogens include hydrogen atoms attached to oxygen, nitrogen or sulfur and thus useful compounds include those having at least two of the groups —OH, —SH, —NH and —NH$_2$. The active-hydrogen containing composition is preferably a diol selected from the group consisting of polyester diols, polyether diols, polyacetal diols, polyamide diols, polyester polyamide diols, poly(alkylene ether) diols, polythioether diols and polycarbonate diols.

Suitable polyether diols are, for example, the condensation products of ethylene oxide, propylene oxide, butylene oxide, or tetrahydrofuran, and their copolymerization, graft or block polymerization products, such as, mixed ethylene oxide, propylene oxide condensates, and the graft polymerization products of the reaction of olefins under high pressure with the mentioned alkylene oxide condensates. Suitable polyethers are prepared by the condensation of the mentioned alkylene oxides with polyhydric alcohols, such as, ethylene glycol, 1,2-propylene glycol and 1,4-butanediol.

Suitable polyester diols, polyester amide diols and polyamide diols are preferably saturated and are obtained, for example, from the reaction of saturated or unsaturated polycarboxylic acids with saturated or unsaturated polyhydric alcohols. Suitable carboxylic acids for preparing these compounds include, for example, adipic acid, succinic acid, phthalic acid, terephthalic acid, and maleic acid. Suitable polyhydric alcohols for preparing the polyester diols include, for example, ethylene glycol, 1,2-propylene glycol, 1,4-butanediol, neopentyl glycol, hexanediol, and trimethylolpropane. A suitable amino alcohol for preparing polyester amide diols is, for example, ethanolamine. Suitable diamines for preparing polyesteramide diols and polyamide diols are, for example, ethylene diamine and hexamethylene diamine.

Suitable polyacetals can be prepared, for example, from 1,4-butanediol or hexanediol and formaldehyde. Suitable polythioether diols can be prepared, for example, by the condensation of thiodiglycol with ethylene oxide, propylene oxide, butylene oxide or tetrahydrofuran.

Additional useful diols include Bisphenol A, polybutadiene based diols, polysiloxane based diols, fluorinated diols and mixtures thereof. In addition to the polyols disclosed above, compounds such as diamines, aminoalcohols and mercaptans, are also useful.

The most preferred difunctional active-hydrogen containing starting materials are a combination of 1) the polyester diols formed from the reaction of saturated and unsaturated dihydric alcohols such as ethylene glycol, propylene glycol, neopentyl glycol, 1,4-butanediol, 1,4-butenediol, 1,6-hexanediol, furan dimethanol, and cyclohexane dimethanol with saturated and unsaturated polycarboxylic acids such as maleic acid, fumaric acid, itaconic acid, succinic acid, glutaric acid, adipic acid, isophthalic acid, terephthalic acid, phthalic anhydride, dimethyl terephthalate, dimer acids and the like; and 2) a diol containing hydrophilic groups. One such preferred polyester diol is Rucoflex™ 1015-120 (a mixture of polyester diols based on neopentyl glycol, hexanediol and adipic acid, commercially available from Ruco Polymer Corporation). A particularly preferred diol containing hydrophilic groups is dimethylolpropionic acid. When used, these two diols are preferably present in percentages such that the Rucoflex™ material contributes between about 30% to about 70% of the OH functionality of the total materials. As the examples below demonstrate, a preferred embodiment comprises Rucoflex™ 1015-120, trimethylolpropane, dimethylolpropionic acid and cyclohexane dimethanol.

Although it is preferred to use difunctional active hydrogen containing compounds, small amounts of tri- and higher functional compounds may be used. Examples of such higher functional compounds include trimethylol propane, pentaerythritol, polyester triols and polyether triols. Large amounts of such higher functional compounds will create a highly crosslinked, non-linear prepolymer in solution.

In one preferred embodiment, the polyurethane component contains at least one functional group that enables the polyurethane component to further crosslink (autooxidatively or otherwise) once the composition has been applied to the substrate and is exposed to ambient air drying conditions normally associated with air drying paints. For baked industrial finishes, suitable crosslinkers such as, for example, methoxy melamines, blocked isocyanates, oxazolines and other crosslinkers which can react with the above mentioned groups can be included in the coating composition. For two-part systems, crosslinkers such as, for example, aziridines, carbodiimides, polyisocyanates, epoxy silanes and other crosslinkers which can react with the above mentioned groups can be included in the coating composition.

During the preparation of an isocyanate functional polyurethane prepolymer, the preferred ratio of total active-hydrogen containing materials to isocyanate should be such that there is an excess of isocyanate functionality over active-hydrogen functionality. Preferably, the ratio of molar equivalents of NCO to total active-hydrogen should be between about 1.01:1 to about 2.0:1; preferably between about 1.01:1 to about 1.7:1. In order to prepare a hydroxy functional polyrurethane prepolymer, there should be an excess of hydroxy functionality over isocyanate functionality.

Optionally, and preferably present during the reaction is up to about 0.06%, preferably between about 0.01% and about 0.04% (by weight based upon total solids of active-hydrogen containing compositions and diisocyanate) of a catalyst such as di-butyl tin dilaurate, tin octoate and the like.

To ensure that the polyurethane prepolymer is dispersible in an aqueous media such as a latex media, pendant ionizable groups are incorporated into the prepolymer and then subsequently ionized. Useful ionizable groups include pendant groups such as carboxylate, sulfonate, sulfate, phosphonate and/or phosphate groups located along the polymer backbone. Preferred are carboxylate groups which are derived by preparing the polyurethane prepolymer from an active hydrogen containing composition having a carboxyl group. For example, diols, diamines and difunctional thiols containing a carboxyl group are useful. The preferred carboxy-functional active hydrogen containing composition is dimethylolpropionic acid. The polyurethane prepolymer must contain a sufficient amount of the carboxyl groups which are ionized by neutralization to render the polyurethane prepolymer dispersible. Preferably, between about 1% and about 10% of the polyurethane prepolymer weight solids is contributed by active-hydrogen containing compositions having ionizable groups.

The ionizable groups of the polyurethane prepolymer are converted by combining the prepolymer with water containing a tertiary amine. Tertiary amines that may be used include triethylamine, trimethylamine, triisopropyl amine, tributyl amine, triethylene diamine, N,N-dimethyl-cyclohexyl amine, N,N-dimethylstearyl amine, N,N-dimethyl aniline, N-methylmorpholine, N-ethylmorpholine, N-methylpiperazine, N-methylpyrrolidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine, 5-diethylamino-2-pentanone and mixtures thereof, and dispersed. The amount of tertiary amine added should be sufficient to neutralize at least about 90% of the ionic groups present in solution. Preferably, the tertiary amine is added in an amount sufficient to neutralize 100% of the ionic groups. Other weak bases may be used to neutralize the ionic groups, but tertiary amines are preferred because they do not react with the free isocyanate groups of the prepolymer.

Preparation of the polyurethane prepolymer is typically carried out by charging the active-hydrogen containing composition with the catalyst to a reaction vessel, heating the contents to a temperature of between about 85° C. and about 100° C., and adding, via continuous or stepwise addition over a period of time, preferably between about 0.5 hour to about 1.5 hours, the isocyanate-functional materials. Optionally present can be a solvent such as n-methyl-2-pyrrolidone, dimethyl formamide, methyl ethyl ketone, toluene, and mixtures thereof in an amount ranging up to about 20% by weight based upon the total weight of the materials present in the reaction vessel. After complete addition of the isocyanate materials, the reaction vessel temperature is maintained between about 85° and 100° C. for approximately 3 to 4.5 hours. The residual isocyanate percentage can be measured by any means well known in the art. At this point, the polyurethane prepolymer is now formed and is ready for further reaction according to this invention.

The prepolymer is dispersed in water containing a tertiary amine such as, for example, triethylamine, which neutralizes the ionic groups of the prepolymer. Once the polyurethane is dispersed in water, the dispersion is ready for incorporation of the waterborne polymer component.

Overall, the weight ratio of polyurethane prepolymer component to waterborne polymer component is generally in the range of about 1:99 to about 99:1, preferably from about 1:4 to about 1:1.

In order to chain extend the polyurethane prepolymer, a functional compound capable of chain extending the polyurethane prepolymer such as a polyol, an amino alcohol, a primary or secondary aliphatic, alicyclic, aromatic or heterocyclic amine or diamine, ammonia, an amine functional silicone or amine functional silane, a water dispersible or emulsifiable polyisocyanate, a polyaldehyde or an epoxy silane may be used. Water-soluble chain extenders are preferred. Examples of suitable chain extenders include ethylene diamine, propylene diamine, butylene diamine, hexamethylene diamine, cyclohexylene diamine, piperazine, 2-methyl piperazine, isophorone diamine, phenylene diamine, tolylene diamine, xylylene diamine, hydrazine, dimethylhydrazine, adipic dihydrazide, mono- and diaminioalkoxy silanes, ethylene glycol, di-, tri-, and tetraethylene glycol, propane 1,2-diol, propane 1,3-diol, neopentyl glycol, mixtures thereof, equivalents thereof and the like in an amount sufficient to react with up to at least 90% of the theoretical amount of residual NCO functionality is generally added to the composition for chain extension of the polyurethane. If the polyurethane prepolymer is hydroxy, mercapto, n-methylol or acetoacetoxy functional, water dispersible polyisocyanates can be used as the chain extender. Chain extenders having a functionality greater than two such as, for example, diethylenetriamine, can also be included but should be limited to a small amount to avoid creating a composition that is highly crosslinked.

As discussed above, the dispersing media for the polyurethane prepolymer is preferably water to which the waterborne polymer component is subsequently added. It can be a combination of the waterborne polymer component and additional water.

Variations on the Polyurethane Structure

In one embodiment, the polyurethane component of the present invention contains ingredients that enable it to autooxidatively cure after application to the substrate when exposed to ambient air curing conditions normally associated with architectural paints and coatings. In one embodiment, during or subsequent to the preparation of the polyurethane prepolymer, but prior to the chain extension of the prepolymer in the waterborne polymer component, compositions which attach to the polyurethane backbone can be added to the prepolymer composition. Each of these compositions are reacted directly to the polyurethane backbone but remain unreactive during the chain extension process and also remain unreactive during normal storage of the final product. However, upon application of the product to the substrate and exposure to drying conditions normally associated with air drying paint, these added functionalities autooxidatively cure the polyurethane component. Preferred compositions that allow such post-application crosslinking include active-hydrogen containing compositions that are monofunctional or difunctional with respect to isocyanates. Some of these active-hydrogen containing materials include the fatty amines, allyl amines, diallyl amines, ethoxylated allyl amines, ethoxylated allyl alcohols, fatty alcohols, allyl alcohols, trimethylol propane mono- and di-allyl ether, hydroxy ethyl acrylate, hydroxy ethyl methacrylate, mono- and di-glycerides obtained by alcoholysis of drying oils with polyols or the reaction of drying fatty acids with polyols, acetoacetate-containing materials such as the adduct of trimethylolpropane with t-butyl acetoacetate, direct introduction of acetoacetate functionality onto the polyurethane prepolymer by reaction with t-butyl acetoacetate or diketene and reaction of the backbone with anhydride-functional drying oils.

Post-crosslinking functionalities that cure by the condensation mechanism may also be added to the polyurethane polymer backbone, for example, by reacting the isocyanate functional polyurethane prepolymer with an amine functional di- or trialkoxysilane, a diamine functional di- or trialkoxysilane, an isocyanate functional di- or trialkoxysilane or epoxy functional di- or trialkoxy silane. Post-crosslinking functionalities can also be prepared by treating the polyurethane prepolymer with adipic dihydrazide and formaldehyde.

Additionally, the polyurethane prepolymer may be modified to include post-crosslinking functionalities by incorporation of epoxy-functional oils, anhydride functional oils, epoxy functional di- or trialkoxysilanes, or amine or diamine functional di- or trialkoxysilanes in the chain extension stage. Aminoplast crosslinkers such as hexamethoxymelamine or those with a high content of N-methylol or imino groups can be added in the chain extension step to introduce crosslinking by condensation.

Waterborne Polymer Component

Suitable for use as the functionalized waterborne polymer component of the invention are waterborne polymers that contain functional groups which are reactive with the isocyanate, hydroxy, n-methylol, mercapto or acetoacetoxy functionality of the polyurethane prepolymer or the polyamine, polyhydroxy, polyisocyanate or polyanhydride chain extender, as well as the carboxyl groups and any other functional groups on the prepolymer. Such waterborne polymers include latex emulsions, acrylic polymers, polyester emulsions, water-reducible alkyd polymers, alkyd emulsions, alkyd-acrylic hybrid polymer dispersions, fluoropolymer emulsions, silicone emulsions, epoxy dispersions, epoxy-acrylic dispersions, water dispersible or emulsifiable polyisocyanates, polyethylene emulsions, polypropylene emulsions, polyurethane dispersions, polyamide dispersions and polyurethane-acrylic dispersions. These waterborne polymers may contain amine, hydroxy and/or mercaptan functional groups to react with the isocyanate functional groups of an isocyanate functional polyurethane prepolymer or water dispersible polyisocyanate chain extender. The waterborne polymers may also contain isocyanate or anhydride functional groups to react with the hydroxy functional groups of a hydroxy functional polyurethane prepolymer. Alternatively, these waterborne polymers may contain isocyanate, epoxy or acetoacetate groups to react with the amine or hydroxy functional groups of the chain extender to form crosslinked polymer chains of each network intimately associated with one another or become indirectly crosslinked to each other or the polyurethane component through the chain extender.

A waterborne polymer useful in the present invention is a conventional latex composition which contains amine, hydroxy or mercaptan functionality to enable the latex to crosslink directly to the isocyanate functionality of the polyurethane prepolymer. If the polyurethane prepolymer is hydroxy functional, the latex may contain isocyanate or anhydride functionality to react with the hydroxyl groups of the polyurethane prepolymer. In addition, the latex may contain isocyanate or epoxy functionality to react to the carboxyl groups of the polyurethane prepolymer. The functional latex may also crosslink with the polyurethane prepolymer indirectly by reacting with the functional groups of the chain extender. Such useful latexes include those having isocyanate, epoxy or acetoacetoxy, carbonate or anhydride functionality to react with the amine groups of the chain extender.

Conventional latex polymers are prepared by polymerizing at least one ethylenically unsaturated monomer in water using surfactants and water soluble initiators. Typical ethylenically unsaturated monomers include vinyl monomers, acrylic monomers, allylic monomers, acrylamide monomers, and mono- and dicarboxylic unsaturated acids. Vinyl esters include vinyl acetate, vinyl propionate, vinyl butyrates, vinyl isopropyl acetates, vinyl neodeconate and similar vinyl esters; vinyl halides include vinyl chloride, vinyl fluoride, and vinylidene chloride; vinyl aromatic hydrocarbons include styrene, α-methyl styrenes, and similar lower alkyl styrenes. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate, and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, and benzyl acrylate and methacrylate. Preparation of latex compositions is well-known in the paint and coatings art. Any of the well-known free-radical emulsion polymerization techniques used to formulate latex polymers can be used in the present invention.

Isocyanate functional monomers can be prepared by the addition of isophorone diisocyanate with hydroxy ethyl acrylate or methacrylate, or the addition of 4,4'-dicyclohexylmethane diisocyanate or meta-1,1,3,3-tetramethylxylylene diisocyanate with hydroxy ethyl acrylate or methacrylate. Examples of isocyanate functional monomers include meta-isopropenyl-α,α-dimethyl isocyanate (m-TMI), para-isopropenyl α,α-dimethylbenzyl isocyanate (p-TMI) and isocyantoethyl methacrylate. Isocyanate functional latexes are prepared by reaction of the isocyanate functional monomers with other standard acrylic or vinyl acrylic latex ingredients.

Epoxy functional latexes can be produced from monomers which include glycidyl acrylate and methacrylate, n-glycidyl acrylamide and allyl glycidyl ether. Acetoacetoxy functional latexes include those that contain acetoacetoxyethyl methacrylate, acetoacetoxy ethyl acrylate, acetoacetoxypropyl methacrylate, allyl acetoacetate, acetoacetoxybutyl methacrylate, 2,3-di(acetoacetoxy) propyl methacrylate and n-acetoacetyl acrylamide.

Hydroxy functional latexes can be produced from polymerizable monomers such as allyl alcohol and hydroxy alkyl acrylates and methacrylates including, for example, hydroxylethyl acrylate and methacrylate, hydroxypropyl acrylate and methacrylate, hydroxybutyl acrylate and methacrylate and mixtures thereof.

Carbonate and anhydride functional latexes can be produced from vinyl or allyl carbonates and maleic anhydride.

As with the polyurethane component, the waterborne polymer component may contain functionalities that cure after the coating composition has been applied to the substrate. Such post-application crosslinking functionalities include those listed above as variations of the polyurethane structure.

Coating Formulas

Once dispersed into the dispersing media, the composition can be modified with other standard ingredients commonly used to formulate paints and coatings. For example, the dispersions of this invention can be combined with other ingredients such as pigments, extenders, dispersants, surfactants, colorants, paraffins, waxes, UV light stabilizers, rheology modifiers, mildewcides, biocides, fungicides, and other conventional additives. Colorants and pigment dispersions, when used, are typically added in amounts up to about 15% by volume of the total composition.

EXAMPLES

The following examples demonstrate methods of preparation of the compositions of this invention. They also demonstrate the preparation of representative polyurethane components and representative functionalized waterborne polymer components. The examples are intended to be representative of the formulations which can be made and are not intended to limit the scope of the invention.

Exammple 1

Acetoacetate-Epoxy Functional Latex

Using standard polymerization techniques, an acetoacetate-epoxy functional latex was prepared by first adding to a vessel 400 g of water, 2.8 g of sodium carbonate, and 3.3 g of surfactant (Rhodapex CO436 commercially available from Rhone-Poulenc) and raising the temperature to 62° C. A pre-emulsion of the following ingredients was prepared and then added dropwise over a period of approximately 3 hours: 480 g water, 32.74 g Rhodapex CO436 surfactant, 49.42 g of Igepal CA 897 surfactant (commercially available from Rhone-Poulenc), 1031.2 g butyl acrylate, 621.0 g methyl methacrylate, 197.4 g acetoacetoxy ethyl methacrylate, 77.81 g glycidyl methacrylate, 39.72 g of a 50% by weight solids ureido-containing acrylate monomer (R-6852 commercially available from Rohtn Tech) and 3.01g dodecyl mercaptan.

A second feed of initiator consisting of 5.01 g ammonium persulfate in 180 g of water was added over 3.5 hours. A third feed of 5.01 g of sodium metabisulfite in 180 g of water was added to the vessel over about 4 hours. Thereafter, the reaction was held for 20 minutes and then chased over 30 minutes at 55° C. with a total of 2.74 g of t-butyl peroxide (70% by weight in water) in 30.0 g of water and 1.92 g of sodium metabisulfite in 30.0 g of water. The contents were then held for an additional 20 minutes.

Example 2

Preparation of Interpenetrating Network Using Latex of Example 1

A reaction vessel equipped with a nitrogen blanket was charged with 35.0 g of n-methyl pyrolidinone, 180 g of Rucoflex™ 1015-120 polyester diol mixture, 25.0 g of dimethylolpropionic acid, 6.0 g of trimethylolpropane, 10.0 g of 1,4-cyclohexane dimethanol and approximately 1 g of dibutyl tin dilaurate (10% solution in n-methyl pyrolidinone). The contents of the vessel were stirred and the temperature was increased to about 90° C. A 30 minute addition of 146.52 g of meta-1,1,3,3-tetramethylxylylene diisocyanate (m-TMXDI) and 74.74 g of 4,4'-dicyclohexylmethane diisocyanate was then begun. The contents of the vessel were held for 3.5 to 4 hours, or until the theoretical isocyanate value was reached, and then 17.88 g of soya primary amine (Kemamine P997 from Witco) were added over a 15 minute period. The reaction was held under these conditions for about 30 minutes to create a polyurethane prepolymer. Triethylamine, in an amount of 17.88 g, was added to the polyurethane prepolymer and then the prepolymer was added to a vessel containing 528.0 g of water and dispersed well. The acetoacetoxy-epoxy functional latex of Example 1 was added to the vessel in an amount of 770.78 g. Stirring was continued for an additional period of about 4 minutes after which 22.68 g of ethylene diamine in 35 g of water were added to the vessel over a period of about 5 minutes to chain extend the prepolymer while keeping the dispersion cold. The contents of the vessel were then dispersed for 45 additional minutes. The resulting interpenetrating network had a solids content of 50% by weight. Both the polyurethane and the latex have post-application crosslinking groups.

Example 3

Isocyanate Functional Latex

Using standard emulsion polymerization techniques, an isocyanate functional latex was prepared by first adding to a vessel 960 g of water and 3.0 g of sodium carbonate. The temperature of the vessel contents was raised to 40° C. and the following monomer mix was fed dropwise over a period of five hours into the vessel: 493.90 g methyl methacrylate, 576.28 g butyl acrylate, 246.95 g 2-ethylhexyl acrylate, 246.95 g isobutylmethacrylate, 66.86 g m-TMI (an isocyanate functional monomer commercially available from Cytec Industries), 32.93 g ureido-containing acrylate monomer (R-6852 commercially available from Rohm Tech). A second feed consisting of 3.95 g of sodium persulfate, 260 g additional water, 35.79 g sodium docecyl benzene sulfonate (Siponate DS4 from Alcolac, Inc.) and 60.37 g sodium lauryl phosphate (Sipon UB from Rhone-Poulenc) surfactants was added over a period of 5.5 hours. At the same time, a third feed consisting of a mixture of 3.8 g sodium formaldehyde sulfoxylate (SFS) in 260 g of water was added to the vessel over a period of six hours. After completing the addtion of all three feeds, the contents of the vessel were held at 40° C. for 20 additional minutes and then chased with 2.35 g t-butyl peroxide in 25 g water and 1.6 g SFS in 25 g of water.

Example 4

Preparation of Interpenetrating Network Using the Latex of Example 3

A reaction vessel equipped with a nitrogen blanket was charged with 40.0 g of n-methyl pyrolidinone, 180 g of Rucoflex™ 1015-120 polyester diol mixture, 24.0 g of dimethylolpropionic acid, 4.0 g of trimethylolpropane, 10.0 g of 1,4-cyclohexane dimethanol and approximately 1 g of dibutyl tin dilaurate (10% solution in n-methyl pyrolidinone). The contents of the vessel were stirred and the temperature was increased to about 92° C. A 30 minute addition of 140.54 g of meta-1,1,3,3-tetramethylxylylene diisocyanate (m-TMXDI) and 69.62 g of 4,4'-dicyclohexylmethane diisocyanate was then begun. The contents of the vessel were held for 3.5 to 4 hours, or until the theoretical isocyanate value was reached, and then to create a polyurethane prepolymer. Triethylamine, in an amount of 17.16 g, was added to the polyurethane prepolymer and then the prepolymer was added to a vessel containing 592.89 g of water and dispersed well. The isocyanate functional latex of Example 3 was added to the vessel in an amount of 2569.14 g. Stirring was continued for an additional period of about 4 minutes after which 25.02 g of ethylene diamine in 25 g of water was added to the vessel over a period of about 5 minutes to chain extend the prepolymer while keeping the dispersion cold. The contents of the vessel were then dispersed for 45 additional minutes. The resulting interpenetrating network had a solids content of 47% by weight.

Example 5

Acetoacetate Functional Latex

Using standard polymerization techniques, an acetoacetate functional latex was prepared by first adding to a vessel 460 g of water, 2.8 g of sodium carbonate, 3.20 g of EP-120 surfactant (commercially available from Rhone-Poulenc) and 1.92 g of Igepal CA 897 surfactant and raising the temperature to 60° C. A pre-emulsion of the following ingredients was prepared and then added dropwise over a period of approximately 3 hours: 480 g water, 70.36 g EP 120 surfactant, 52.08 g of Igepal CA 897 surfactant, 5.12 g of a 28% solution of ammonia, 1036.26 g butyl acrylate, 671.65 g methyl methacrylate, 153.41 g acetoacetoxy ethyl methacrylate, 38.81 g methacrylic acid, 38.21 g ureido-containing acrylate monomer (R-6852 commercially available from Rohm Tech) and 2.98 g dodecyl mercaptan.

A second feed consisting of 4.94 g ammonium persulfate in 140 g of water was added over 3.5 hours. A third feed of 4.94 g of sodium metabisulfite in 140 g of water was added to the vessel over about 4 hours. Thereafter, the reaction was held for 20 minutes and then chased over 30 minutes with a total of 2.71 g of t-butyl peroxide (70% by weight in water) in 20.0 g of water and 1.9 g of sodium metabisulfite in 20.0 g of water. The contents were then held for an addtional 20 minutes.

Example 6

Preparation of Interpenetrating Network Using Latex of Example 5

A reaction vessel equipped with a nitrogen blanket was charged with 33.75 g of n-methyl pyrolidinone, 180 g of Rucoflex™ 1015-120 polyester diol mixture, 25.0 g of dimethylolpropionic acid, 6.0 g of trimethylolpropane, 10.0 g of 1,4-cyclohexane dimethanol and approximately 1 g of dibutyl tin dilaurate (10% solution in n-methyl pyrolidinone). The contents of the vessel were stirred and the temperature was increased to about 90° C. A 30 minute addition of 146.52 g of meta-1,1,3,3-tetramethylxylylene diisocyanate (m-TMXDI) and 74.86 g of 4,4'-dicyclohexylmethane diisocyanate was then begun. The contents of the vessel were held for 3.5 to 4 hours, or until the theoretical isocyanate value was reached, and then 12.5 g of soya primary amine (Kemamine P997 from Witco) were added over a 15 minute period. The reaction was held under these conditions for about 60 minutes to create a polyurethane prepolymer. Triethylamine, in an amount of 17.88 g, was added to the polyurethane prepolymer and then the prepolymer was added to a vessel containing 521.5 g of water and dispersed well. The acetoacetate functional latex of Example 5 was added to the vessel in an amount of 777.57 g. Stirring was continued for an additional period of about 4 minutes after which 19.6 g of ethylene diamine in 35 g of water was added to the vessel over a period of about 5 minutes to chain extend the prepolymer while keeping the dispersion cold. The contents of the vessel were then dispersed for 45 additional minutes. The resulting interpenetrating network had a solids content of 50% by weight. Both the polyurethane and the latex have post-application crosslinking groups.

Example 7

Epoxy-Isocyanate Functional Latex

Using standard polymerization techniques, an epoxy-isocyanate functional latex was prepared by first adding to a vessel 981.0 g of water, 6.89 g of sodium dodecyl benzene disulfonate surfactant (Rhodocal DSB commercially available from Rhone-Poulenc), 14.14 g of Dowfax 8390 surfactant and 03.0 g of sodium carbonate. The temperature was then raised to 40° C. and the following monomer mix was added dropwise over a period of approximately 3 hours: 920.0 g butyl acrylate, 685.6 g methyl methacrylate, 91.0 g glycidyl methacrylate, 37.0 g ureido-containing acrylate monomer (R-6852 commercially available from Rohm Tech) 18.0 g methacrylic acid, 40.0 g m-TMI, an isocyanate functional monomer from Cytec Industires, and 0.9 g dodecyl mercaptan.

A second feed consisting of 55.75 g Dowfax 8390 surfactant, 39.42 g Rhodacal DSB surfactant, 270 g water and 5.0 g sodium ber sulfate was added over 3.5 hours. A third feed of 2.5 g of sodium formaldehyde suloxylate (SFS) and a trace amount of ferrous sulfate in 270 g of water was added to the vessel over about 4 hours. Thereafter, the reaction was held for 20 minutes and then chased over 30 minutes with a total of 2.42 g of t-butyl peroxide (70% by weight in water) in 30 g of water and 1.6 g of SFS in 30 g of water. The contents were then held for an addtional 20 minutes.

Example 8

Preparation of Interpenetrating Network Using Latex of Example 7

A reaction vessel equipped with a nitrogen blanket was charged with 50.0 g of n-methyl pyrolidinone, 160.0 g of Rucoflex™ 1015-120 polyester diol mixture, 25.0 g of dimethylolpropionic acid, 7.5 g of trimethylolpropane, 10.0 g of 1,4-cyclohexane dimethanol and approximately 1 g of dibutyl tin dilaurate (10% solution in n-methyl pyrolidinone). The contents of the vessel were stirred and the temperature was increased to about 92° C. A 30 minute addition of 170.94 g of meta-1,1,3,3-tetramethylxylylene diisocyanate (m-TMXDI) and 69.62 g of 4,4'-dicyclohexylmethane diisocyanate was then begun. The contents of the vessel were held for 3.5 to 4 hours, or until the theoretical isocyanate value was reached, and then 10.0 g of soya primary amine (Adogen 115D from Witco) were added over a 15 minute period. Hydroxy ethyl acrylate in an amount of 10.0 g and 5.0 g of aminopropyltriethoxy silane were then added to the vessel and the reaction was held under these conditions for about 60 minutes to create a polyurethane prepolymer.

The polyurethane prepolymer was added to a vessel containing 834.47 g of water and 18.0 g of triethylamine and dispersed well. The epoxy-isocyanate functional latex of Example 7 was added to the vessel in an amount of 2700.34 g. Stirring was continued for an additional period of about 4 minutes after which 35.43 g of ethylene diamine in 40 g of water was added to the vessel over a period of about 5 minutes to chain extend the prepolymer while keeping the dispersion cold. The contents of the vessel were then dispersed for 45 additional minutes. The resulting interpenetrating network had a solids content of 46% by weight. The polyurethane has post crosslinking groups.

Example 9

Acetoacetate-Isocyanate-Epoxy Functional Latex

Using standard polymerization techniques, an acetoacetate-isocyanate functional latex was prepared by first adding to a vessel 545.0 g of water, 5.0 g of sodium dodecyl benzene disulfonate surfactant (Rhodocal DSB commercially available from Rhone-Poulenc), 10.0 g of Dowfax 8390 surfactant and 1.5 g of sodium carbonate and raising the temperature to 40° C. The following monomer mix was added dropwise over a period of approximately 3 hours: 392.0 g butyl acrylate, 2-ethylhexylacrylate, 392.0 g methyl methacrylate, 105.0 g acetoacetoxy ethyl methacrylate, 56 g glycidyl methacrylate, 23.0 g ureido-containing acrylate monomer (R-6852 commercially available from Rohm Tech) 10.8 g methacrylic acid, 45.0 g m-TMI, and 0.6 g dodecyl mercaptan.

A second feed consisting of 40.0 g Dowfax 8390 surfactant, 27.6 g Rhodocal DSB surfactant, 210 g water and 3.1 g sodium per sulfate was added over 3.5 hours. A third feed of 2.9 g of sodium formaldehyde sulfoxylate (SFS) and a trace amount of ferrous sulfate in 210 g of water was added to the vessel over about 4 hours. Thereafter, the reaction was held for 20 minutes and then chased over 30 minutes with 1.6 g of t-butyl peroxide (70% by weight in water) in 25 g of water and 1.0 g of SFS in 25 g of water. The contents were then held for an addtional 20 minutes.

Example 10

Preparation of Interpenetrating Network Using Latex of Example 9

A reaction vessel equipped with a nitrogen blanket was charged with 50.0 g of n-methyl pyrolidinone, 160.0 g of Rucoflex™ 1015-120 polyester diol mixture, 25.0 g of dimethylolpropionic acid, 7.5 g of trimethylolpropane, 10.0 g of 1,4-cyclohexane dimethanol and approximately 1 g of dibutyl tin dilaurate (10% solution in n-methyl pyrolidinone). The contents of the vessel were stirred and the temperature was increased to about 92° C. A 30 minute addition of 170.94 g of meta-1,1,3,3-tetramethylxylylene diisocyanate (m-TMXDI) and 69.62 g of 4,4'-dicyclohexylmethane diisocyanate was then begun. The contents of the vessel were held for 3.5 to 4 hours, or until the theoretical isocyanate value was reached, and then 10.0 g of soya primary amine (Adogen 115D from Witco) were added over a 15 minute period. Hydroxy ethyl acrylate in an amount of 10.0 g and 5.0 g of aminopropyltriethoxysilane were then added to the vessel and the reaction was held under these conditions for about 60 minutes to create a polyurethane prepolymer.

The polyurethane prepolymer was added to a vessel containing 440.06 g of water and 18.8 g of triethylamine and dispersed well. The acetoacetate-isocyanate-epoxy functional latex of Example 9 was added to the vessel in an amount of 940.63 g. Stirring was continued for an additional period of about 4 minutes after which 28.43 g of ethylene diamine in 30 g of water was added to the vessel over a period of about 5 minutes to chain extend the prepolymer while keeping the dispersion cold. The contents of the vessel were then dispersed for 45 additional minutes. The resulting interpenetrating network had a solids content of 47% by weight. The latex has post-application crosliking groups.

Example 11

Acetoacetate-Isocyanate Functional Latex

Using standard polymerization techniques, an acetoacetate-isocyanate functional latex was prepared by first adding to a vessel 1050.0 g of water, 6.9 g of sodium dodecyl benzene disulfonate surfactant (Rhodocal DSB commercially available from Rhone-Poulenc), 12.0 g of Dowfax 8390 surfactant and 2.7 g of sodium carbonate and raising the temperature 40° C. The following monomers were added dropwise over a period of approximately 3 hours: 910.6 g butyl acrylate, 696.0 g methyl methacrylate, 85.15 g acetoacetoxy ethyl methacrylate, 37.1 g ureido-containing acrylate monomer (R-6844 commercially available from Rohm Tech) 18.0 g methacrylic acid, 37.0 g m-TMI.

A second feed consisting of 55.0 g Dowfax 8390 surfactant, 39.0 g Rhodacal DSB surfactant, 270 g water and 5.0 g sodium per sulfate were added over 3.5 hours. A third feed of 4.86 g of sodium formaldehyde sulfoxylate (SFS) and a trace amount of ferrous sulfate in 270 g of water was added to the vessel over about 4 hours. Thereafter, the reaction was held for 20 minutes and then chased over 30 minutes with a total of 2.42 g of t-butyl peroxide (70% by weight in water) in 30 g of water and 1.6 g of SFS in 30 g of water. The contents were then held for an addtional 20 minutes.

Example 12

Preparation of Interpenetrating Network Using the Latex of Example 11

A reaction vessel equipped with a nitrogen blanket was charged with 40.0 g of n-methyl pyrolidinone, 190.0 g of Rucoflex™ 1015-120 polyester diol mixture, 25.0 g of dimethylolpropionic acid, 7.5 g of trimethylolpropane, 10.0 g of 1,4-cyclohexane dimethanol and approximately 1 g of dibutyl tin dilaurate (10% solution in n-methyl pyrolidinone). The contents of the vessel were stirred and the temperature was increased to about 92° C. A 30 minute addition of 178.99 g of meta-1,1,3,3-tetramethylxylylene diisocyanate (m-TMXDI) and 69.62 g of 4,4'-dicyclohexylmethane diisocyanate was then begun. The contents of the vessel were held for 3.5 to 4 hours, or until the theoretical isocyanate value was reached, and then 10.0 g of soya primary amine (Adogen 115D from Witco) were added over a 15 minute period. Hydroxy ethyl acrylate in an amount of 10.0 g was then added to the vessel and the reaction was held under these conditions for about 60 minutes to create a polyurethane prepolymer.

The polyurethane prepolymer was added to a vessel containing 732.5 g of water and 17.88 g of triethylamine and dispersed well. The acetoacetate-isocyanate functional latex of Example 11 was added to the vessel in an amount of 3068.08 g. Stirring was continued for an additional period of about 4 minutes after which 31.5 g of ethylene diamine in 35 g of water was added to the vessel over a period of about 5 minutes to chain extend the prepolymer while keeping the dispersion cold. The contents of the vessel were then dispersed for 45 additional minutes. Both the polyurethane and the latex have post-application crosslinking groups.

Example 13

Preparation of Interpenetrating Network Using an Epoxy Dispersion

A reaction vessel equipped with a nitrogen blanket was charged with 35.0 g of n-methyl pyrolidinone, 189.20 g of Rucoflex™ 1015-120 polyester diol mixture, 27.0 g of dimethylolpropionic acid, 6.0 g of trimethylolpropane, 10.0 g of 1,4-cyclohexane dimethanol and approximately 1 g of dibutyl tin dilaurate (10% solution in n-methyl pyrolidinone). The contents of the vessel were stirred and the temperature was increased to about 92° C. A 30 minute addition of 146.52 g of meta-1, 1,3,3-tetramethylxylylene diisocyanate (m-TMXDI) and 74.86 g of 4,4'-dicyclohexylmethane diisocyanate was then begun. The contents of the vessel were held for 3.5 to 4 hours, or until the theoretical isocyanate value was reached. Hydroxy ethyl acrylate in an amount of 5.81 g was then added to the vessel and the reaction was held under these conditions for about 60 minutes to create a polyurethane prepolymer.

The polyurethane prepolymer was added to a vessel containing 732.5 g of water and 20.32 g of triethylamine and dispersed well. An epoxy dispersion, Epirez 3520-WY55 commercially available from Shell Chemicals, in an amount of 835.25 g was added to the vessel. Stirring was continued for an additional period of about 4 minutes after which 25.62 g of ethylene diamine in 30 g of water was added to the vessel over a period of about 5 minutes to chain extend the prepolymer. The contents of the vessel were then dispersed for 45 additional minutes. The polyurethane has post-application crosslinking groups.

Comparative Example 14

Preparation of Polyurethane Prepolymer Chain Extended in Presence of Latex

A reaction vessel equipped with a nitrogen blanket was charged with 40.0 g of n-methyl pyrrolidone, 180.0 g of Rucoflex 1015-120 , 24.0 g of dimethylolpropionic acid, 4.0 g of trimethylolpropane, 10.0 g of 1,4-cyclohexane dimethanol and approx. 1.0 g of dibutyl tin dilaurate (10% solution in n-methyl pyrrolidinone). The contents of the vessel were stirred and the temperature was increased to about 90° C. A 30–40 minute addition of 140.54 g of m-TMXDI and 696.62 g of 4,4'-dicyclohexylmethane diisocyanate (Desmodur W) was then begun. The contents of the vessel were held for 3.5 to 4 hours to create a polyurethane prepolymer. The polyurethane prepolymer was then added to a vessel containing 872.9 g of water and 17.2 g of triethylamine and dispersed for three minutes. 2140.9 g of the commercially available acrylic latex of Example 1 were then added to the vessel. Stirring was continued for an additional 3–4 minutes at room temperature (approx. 25° C.) after which 18.0 g of ethylene diamine in 25 g of water were added to the vessel over a period of five minutes to chain extend the prepolymer while keeping the dispersion cold. The contents were then dispersed for 45 additional minutes

PERFORMANCE

The functionalized waterborne polymers and interpentrating networks of the present invention were evaluated as coating compositions on cold rolled steel substrates. Clear films were applied to Bonderite 1000 panels and allowed to dry for 2 weeks at room temperature. The coating thickness was 2 mil (dry film).

MEK Rubs: Wet a cotton cloth with methyl ethyl ketone and rub the film applying considerable pressure until the film abrades. A rub is equal to a forward and a backward stroke. The cotton cloth should always be saturated with methyl ethyl ketone. Record the number of rubs necessary to break through the film, not to exceed 400.

Pencil Hardness: Use a set of pencils with various graphite hardnesses that have been quantified and labeled. The graphite should be flat and the pencil held at approximately 45° forcing the edge of the graphite into the film. Record the hardest graphite used to scratch through the film.

Water spot test: Apply a pool of water to the film, cover with a watch glass and let stand for 3 hours. Absorb the remaining water and record the effects.

Gel Fraction: Films (6 mil thick, wet) are drawn down on release paper or polyethylene plates and dried at room temperature for 1 week. About 2.0 gms of the dried film is weighed into a glass bottle and 75–100 gms of acetone is atted to the bottle and agitated well. After 3 days, the contents of the bottle were decanted through a fine nylon screen to a weighed aluminum dish. The contents of the dish were dried in a 140° F. oven for 2 hours and weighed. The gel fraction is calculated by dividing the weight of the dry gel by the weight of the film. Gel fraction is an indication of the molecular weight and crosslink density of the resulting films.

The evaluation results for various coatings prepared in accordance with the present invention are presented in Table I. The control latex listed as an example is a commercially available nonfunctional latex prepared from 50% butylacrylate, 48% methylmethacrylate and 2% methacrylic acid, and having a solids content of 55–60%. The control PUD is a polyurethane dispersion prepared substantially in accordance with the PUD of Example 1, except the polyurethane prepolymer was chain extended in water, without the presence of a functionalized waterborne polymer.

TABLE 1

| Example | MEK Resistance | Pencil Hardness | Water Spot | Gel Fraction |
| --- | --- | --- | --- | --- |
| Example 1 | 40 | 2B | NE* | 47.09 |
| Example 2 | 200 | HB | NE | 92.85 |
| Example 5 | 40 | 2B | NE | — |
| Example 6 | 200 | HB | NE | 94.51 |
| Control Latex | 20 | 2B | Whitens | 35.62 |
| Control PUD | 90 | H | NE | 46.87 |
| Example 14 (Comparative) | 30 | 2B | Whitens | 26.27 |

*NE = No effect

What is claimed is:

1. A process for producing a coating composition, which process comprises:
    a) preparing a functionalized polyurethane prepolymer;
    b) dispersing said polyurethane prepolymer in water to form a polyurethane prepolymer dispersion;
    c) adding at least one functionalized waterborne polymer to said polyurethane prepolymer dispersion, wherein said functionalized waterborne polymer contains at least one functional group that is reactive with the functional group of the polyurethane prepolymer;
    d) chain extending said polyurethane prepolymer with a chain extender in the presence of said waterborne polymer; and
    e) crosslinking said functionalized waterborne polymer with said chain extender.

2. The process of claim 1 wherein said functionalized polyurethane prepolymer contains at least one functional group selected from the group consisting of isocyanate, hydroxy, acetoacetoxy, n-methylol and mercaptan.

3. The process of claim 1 wherein said functionalized waterborne polymer contains at least one functional group selected from the group consisting of amine, hydroxy, mercaptan, isocyanate, epoxy, anhydride and acetoacetoxy.

4. The process of claim 1 wherein said waterborne polymer is selected from the group consisting of latex emulsions, acrylic polymers, water-reducible alkyds, alkyd emulsions, alkyd-acrylic hybrid polymer dispersions, polyurethane dispersions, polyurethane-acrylic dispersions, fluoropolymer emulsions, polyester emulsions, silicone emulsions, polyethylene emulsions, polypropylene dispersions, polyamide dispersions, epoxy dispersion, epoxy-acrylic dispersions, water dispersible or emulsifiable polyisocyanates and mixtures thereof.

5. The process of claim 1 wherein said polyurethane prepolymer and/or said waterborne polymer contain functional groups that crosslink upon film formation and exposure to ambient conditions.

6. The process of claim 5 wherein said functional groups are derived from reaction with a compound selected from the group consisting of fatty amines, allyl amines, diallyl amines, ethoxylated allyl amines, ethoxylated allyl alcohols, fatty alcohols, allyl alcohols, trimethylol propane mono- and di-allyl ether, hydroxy ethyl acrylate, hydroxy ethyl methacrylate, mono- and di-glycerides obtained by alcoholysis of drying oils with polyols or the reaction of drying fatty acids with polyols, acetoacetate-containing materials, anhydride-functional drying oils, trialkoxysilane, epoxy-functional oils, amine functional alkoxysilanes, isocyanate functional alkoxy silanes and epoxy functional alkoxy silanes.

7. The process of claim 1 wherein said chain extender is selected from the group consisting of polyols, amino alcohols, primary or secondary aliphatic, alicyclic, aromatic and heterocyclic amines, amine functional silanes, amine functional silicones, polyisocyanates and polyaldehydes.

* * * * *